(12) United States Patent
Sherman et al.

(10) Patent No.: US 11,691,384 B2
(45) Date of Patent: Jul. 4, 2023

(54) SILOXANE TACKIFYING RESIN LAYERS AS ADHESION PROMOTION AGENTS

(71) Applicant: 3M INNOVATIVE PROPERTIES COMPANY, St. Paul, MN (US)

(72) Inventors: Audrey A. Sherman, Woodbury, MN (US); Claire Hartmann-Thompson, Lake Elmo, MN (US); Daniel J. Rogers, Grant, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 35 days.

(21) Appl. No.: 17/439,038

(22) PCT Filed: Mar. 12, 2020

(86) PCT No.: PCT/IB2020/052227
§ 371 (c)(1),
(2) Date: Sep. 14, 2021

(87) PCT Pub. No.: WO2020/188423
PCT Pub. Date: Sep. 24, 2020

(65) Prior Publication Data
US 2022/0152981 A1    May 19, 2022

Related U.S. Application Data

(60) Provisional application No. 62/821,019, filed on Mar. 20, 2019.

(51) Int. Cl.
*B32B 7/12*    (2006.01)
*C09J 7/24*    (2018.01)
(Continued)

(52) U.S. Cl.
CPC .............. *B32B 7/12* (2013.01); *B32B 1/08* (2013.01); *B32B 3/30* (2013.01); *B32B 7/06* (2013.01);
(Continued)

(58) Field of Classification Search
CPC ....... B32B 27/32; B32B 27/36; B32B 27/365; B32B 27/40; B32B 37/1284;
(Continued)

(56) References Cited

U.S. PATENT DOCUMENTS 2,676,182 A    4/1954    Daudt
2,736,721 A    2/1956    Dexter
(Continued)

FOREIGN PATENT DOCUMENTS

DE    10152724    5/2003
JP    H02-036234    2/1990

OTHER PUBLICATIONS

Encyclopedia of Polymer Science and Engineering—vol. 15, (1989), 265-270.
(Continued)

*Primary Examiner* — Michael C Miggins
(74) *Attorney, Agent, or Firm* — Jeffrey M. Olofson (57) ABSTRACT

Layers of siloxane tackifying resins that do not contain siloxane fluids, gums or polymers act as adhesion promotion agents. Articles include a substrate layer, a non-tacky siloxane tackifying resin adhesion promotion layer disposed on the surface of the substrate layer, and a crosslinked siloxane layer in contact with the adhesion promotion layer. The crosslinked siloxane layer is not an adhesive layer. The adhesion of the crosslinked siloxane layer to the substrate is greater than the adhesion without the non-tacky siloxane tackifying adhesion promotion layer.

21 Claims, 4 Drawing Sheets

(51) Int. Cl.
*C09J 7/28* (2018.01)
*C09J 7/50* (2018.01)
*B32B 1/08* (2006.01)
*B32B 3/30* (2006.01)
*B32B 7/06* (2019.01)
*B32B 9/00* (2006.01)
*B32B 9/04* (2006.01)
*B32B 15/08* (2006.01)
*B32B 17/10* (2006.01)
*B32B 27/08* (2006.01)
*B32B 27/28* (2006.01)
*B32B 27/32* (2006.01)
*B32B 27/36* (2006.01)
*B32B 27/40* (2006.01)
*B32B 37/12* (2006.01)

(52) U.S. Cl.
CPC .............. *B32B 9/005* (2013.01); *B32B 9/045* (2013.01); *B32B 15/08* (2013.01); *B32B 17/10* (2013.01); *B32B 27/08* (2013.01); *B32B 27/283* (2013.01); *B32B 27/32* (2013.01); *B32B 27/36* (2013.01); *B32B 27/365* (2013.01); *B32B 27/40* (2013.01); *B32B 37/1284* (2013.01); *C09J 7/243* (2018.01); *C09J 7/28* (2018.01); *C09J 7/50* (2018.01); *B32B 2255/06* (2013.01); *B32B 2255/10* (2013.01); *B32B 2255/26* (2013.01); *B32B 2270/00* (2013.01); *B32B 2535/00* (2013.01); *B32B 2597/00* (2013.01); *C09J 2400/163* (2013.01); *C09J 2423/106* (2013.01); *C09J 2483/003* (2013.01); *C09J 2491/003* (2013.01)

(58) Field of Classification Search
CPC ............ B32B 2255/06; B32B 2255/10; B32B 2255/26; B32B 2270/00; B32B 2535/00; B32B 2597/00; B32B 7/12; B32B 1/08; B32B 3/30; B32B 7/06; B32B 9/005; B32B 9/045; B32B 15/08; B32B 17/10; B32B 27/08; B32B 27/283; C09J 7/243; C09J 7/28; C09J 7/50; C09J 2400/163; C09J 2423/106; C09J 2483/003; C09J 2491/003
See application file for complete search history.

(56) References Cited

U.S. PATENT DOCUMENTS

| | | |
|---|---|---|
| 3,627,851 A | 12/1971 | Brady |
| 3,772,247 A | 11/1973 | Flannigan |
| 4,935,484 A | 6/1990 | Wolfgruber |
| 5,082,706 A | 1/1992 | Tangney |
| 5,110,890 A | 5/1992 | Butler |
| 5,248,739 A | 9/1993 | Schmidt |
| 5,302,685 A | 4/1994 | Tsumura |
| 5,319,040 A | 6/1994 | Wengrovius |
| 5,449,865 A | 9/1995 | Desnick |
| 2018/0134010 A1* | 5/2018 | Branigan .............. B32B 27/065 |
| 2019/0016935 A1* | 1/2019 | Hays ........................ B32B 25/16 |

OTHER PUBLICATIONS

International Search Report for PCT International Application No. PCT/IB2020/052227, dated Jun. 4, 2020, 4 pages.

* cited by examiner

SILOXANE TACKIFYING RESIN LAYERS AS ADHESION PROMOTION AGENTS

FIELD OF THE DISCLOSURE

This disclosure relates to layers of siloxane tackifying resins and the use of these layers as adhesion promotion agents in the absence of siloxane fluids, gums or polymers.

BACKGROUND

A wide range of articles contain multiple layers. These multiple layers may include a variety of different materials as well as variety of different shapes. The assembly of these articles can require the adhesion of these different layers. Frequently the assembly involves the use of an adhesive to adhere the layers together. A wide range of adhesives can be used including pressure sensitive adhesives and curable adhesives. Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers, and silicones. Curable adhesives include a wide range of materials that upon curing form a strong adhesive bond between two substrates. Examples of curable adhesives include epoxy adhesives, structural acrylate adhesives, 2-part polyurethane adhesives, and the like.

SUMMARY

This disclosure relates to layers of siloxane tackifying resins and the use of these layers as adhesion promotion agents in the absence of siloxane fluids, gums or polymers. The layers of adhesion promotion agents can be used to form articles. In some embodiments, articles comprise a substrate layer with a first major surface and a second major surface, a non-tacky siloxane tackifying resin adhesion promotion layer disposed on at least a portion of the second major surface of the substrate layer, and a crosslinked siloxane layer with a first major surface and a second major surface, where the first major surface of the crosslinked siloxane layer is in contact with the siloxane tackifying resin adhesion promotion layer. The crosslinked siloxane layer is not an adhesive layer. The adhesion of the crosslinked siloxane layer to the substrate is greater than the adhesion of the crosslinked siloxane layer to the substrate without the non-tacky siloxane tackifying adhesion promotion layer.

Also disclosed are precursor articles. In some embodiments, the precursor articles comprise a substrate layer with a first major surface and a second major surface, a non-tacky siloxane tackifying resin adhesion promotion layer disposed on at least a portion of the second major surface of the substrate layer. The non-tacky siloxane tackifying resin adhesion promotion layer is an adhesion promotion layer such that upon contact of the siloxane tackifying resin adhesion promotion layer with a first major surface with a crosslinked siloxane layer, the adhesion of the crosslinked siloxane layer to the substrate is greater than the adhesion of the crosslinked siloxane layer to the substrate without the non-tacky siloxane tackifying adhesion promotion layer. The crosslinked siloxane layer is not an adhesive layer.

Also disclosed are methods for preparing articles. In some embodiments, the method of preparing an article comprises providing a substrate layer with a first major surface and a second major surface, providing a siloxane tackifying resin composition, and providing a crosslinked siloxane layer. The crosslinked siloxane layer is not an adhesive layer. The siloxane tackifying resin is disposed on at least a portion of the second major surface of the substrate layer to form a non-tacky siloxane tackifying resin adhesion promotion layer. Contacting the crosslinked siloxane layer to the non-tacky siloxane tackifying resin adhesion promotion layer, forms a multi-layer article wherein the adhesion of the crosslinked siloxane layer to the substrate is greater than the adhesion of the crosslinked siloxane layer to the substrate without the non-tacky siloxane tackifying adhesion promotion layer.

BRIEF DESCRIPTION OF THE DRAWINGS

The present application may be more completely understood in consideration of the following detailed description of various embodiments of the disclosure in connection with the accompanying drawings.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide range of articles include a variety of different layers that may comprise different materials. The assembly of these articles can require that these different layers be attached or adhered together. Frequently the assembly involves the use of an adhesive to adhere the layers together. A wide range of adhesives can be used including pressure sensitive adhesives and curable adhesives. Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers, and silicones. Curable adhesives include a wide range of materials that upon curing form a strong adhesive bond between two substrates. Examples of curable adhesives include epoxy adhesives, structural acrylate adhesives, 2-part polyurethane adhesives, and the like.

The adhesives typically are provided either as liquids that are dispensed onto a substrate surface and cured or as a tacky solid layer. Handling of the curable liquids or the tacky solids can be difficult. This can make it very difficult to achieve the desired bonding. Therefore, it is desirable to develop methods to adhere together layers of materials without the use of adhesives. Among the methods that have been developed include mechanical means. Examples of mechanical means include interlocking structures such as one surface having a shaped protrusion and other surface having a depression of a complementary shape. This method has drawbacks especially with materials that have a low surface energy such as plastic materials.

An example of a difficult to adhere layer is a crosslinked siloxane layer. Crosslinked siloxane layers are typically low surface energy and do not adhere well to many surfaces. This is especially true with other low surface energy substrates such as polymeric materials, for example polyolefin-based materials. A wide range of articles comprise or include crosslinked siloxane materials. Crosslinked siloxane materials have a wide range of useful properties and thus are used for a wide range of applications. These polymers are soft and pliable, chemically resistant, and can be formed into a wide variety of shapes. Because of their desirable properties, crosslinked siloxane materials have found widespread use in a wide range of fields including medical, industrial, and personal electronics. Their chemical resistance and lack of physiological interactions make them generally medically acceptable, especially for applications where the materials come into contact with human skin. One example that will be discussed in greater detail below is the use of formed parts as earpieces for devices such as stethoscopes, but a wide range of uses are suitable.

An example of a common use for crosslinked siloxane polymers is in articles that are designed to be inserted into the human ear. Among these articles are ear protection devices such as earplugs, as well as a wide range of earpieces. Frequently earpieces have a detachable ear tip portion that is removable and can be replaced if needed. Examples of such ear tips include those for a wide range of listening devices such as earbuds and stethoscopes. These removable ear tips are soft and pliable, and typically are attached to the device surface by mechanical means such as interlocking structures. A typical mechanical means is one where the device surface contains protrusions and the inner surface of the ear tip contains depressions of a complementary shape so that when the ear tip is slid onto the device the structures engage to hold the ear tip in place. However, as mentioned above, as the crosslinked siloxane is a low surface energy material and if the device surface is also a relatively low surface energy surface, such as a polymeric material, this mechanical attachment system can be insufficient. Therefore, it is desirable to have a method for increasing the adhesion of crosslinked siloxane layers to a wide range of substrates that does not involve tacky materials such as adhesives.

In this disclosure, adhesion promoting layers are described that are non-tacky and provide increased adhesion between a wide range of substrates and crosslinked siloxane layers. The non-tacky adhesion promotion layer comprises a siloxane tackifying resin. In some embodiments, the siloxane tackifying resin comprises an MQ tackifying resin and the siloxane tackifying resin is free of siloxane gums, siloxane fluids, and siloxane polymers. Thus, the non-tacky adhesion promotion layer is not an adhesive layer.

The adhesion promoting layer increases the adhesion between a wide range of substrate surfaces and a crosslinked siloxane layer. In some embodiments, the crosslinked siloxane layer may include additional additives.

Disclosed herein are articles that comprise a substrate layer, a non-tacky siloxane tackifying resin adhesion promotion layer disposed on at least a portion of a surface of the substrate layer, and a crosslinked siloxane layer. The non-tacky siloxane tackifying resin adhesion promotion layer increases the adhesion between the crosslinked siloxane layer and the substrate surface over the adhesion without the non-tacky siloxane tackifying resin adhesion promotion layer. The articles can take a wide variety of shapes and forms. In other words, the non-tacky siloxane tackifying resin layer is an adhesion promoting layer despite the fact that it is not itself an adhesive layer. Additionally, this adhesion promoting layer is separate from the crosslinked siloxane layer until the layers are brought into contact, the siloxane tackifying resin is not blended into the crosslinked siloxane layer.

Also disclosed are articles that comprise a substrate layer, a non-tacky siloxane tackifying resin adhesion promotion layer disposed on at least a portion of a surface of the substrate layer. These articles are precursors to the above-described articles. The above-described articles can be prepared by contacting a crosslinked siloxane layer to the precursor article.

Methods for preparing articles are also described, comprising providing a substrate layer, disposing a siloxane tackifying resin of at least a portion of the substrate layer to form a non-tacky siloxane tackifying resin adhesion promotion layer, and contacting a crosslinked siloxane layer to the non-tacky siloxane tackifying resin adhesion promotion layer. A wide variety of methods are suitable for disposing the siloxane tackifying resin to the substrate layer. In some embodiments, a solution of the siloxane tackifying resin is applied and dried to form the layer, in other embodiments a dispersion of the siloxane tackifying resin in a solid media such as a wax, can be applied to the substrate.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives and curable adhesives.

Pressure sensitive adhesive compositions are well known to those of ordinary skill in the art to possess properties including the following: (1) aggressive and permanent tack, (2) adherence with no more than finger pressure, (3) sufficient ability to hold together two adherends, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Curable adhesives include a wide range of materials that upon curing form a strong adhesive bond between two substrates. Examples of curable adhesives include structural adhesives. Structural adhesives refer to adhesives that that can bond other high strength materials (e.g., wood, composites, or metal) so that the adhesive bond strength is in excess of 6.0 MPa (1000 psi).

The term "siloxane or siloxane-based" as used herein refers to polymers that contain units with dialkyl or diaryl siloxane (—$SiR_2O$—) repeating units. The siloxane-based polymers may be segmented copolymers or polysiloxane polymers. The terms silicone and siloxane are used interchangeably.

The term "crosslinked" refers to a polymeric matrix, where all of the component elements of the matrix are linked together such that none of the components contained within the matrix are extractable.

As used herein the term "polymer" refers to a macromolecule that is a homopolymer or a copolymer. As used herein, the term "homopolymer" refers to a polymeric material that is the reaction product of one monomer, and the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl. Simple alkyl groups are abbreviated herein as methyl=Me, ethyl=Et, n-propyl=Pr.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl. The simple aryl group phenyl is abbreviated herein as Ph.

The terms "room temperature" and "ambient temperature" are used interchangeably and refer to a temperature of from 20-25° C.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art Disclosed herein are multi-layer articles. These multi-layer articles may take a wide range of shapes and configurations. The articles comprise a substrate layer with a first major surface and a second major surface, a non-tacky siloxane tackifying resin adhesion promotion layer disposed on at least a portion of the second major surface of the substrate layer, and a crosslinked siloxane layer with a first major surface and a second major surface, where the first major surface of the crosslinked siloxane layer is in contact with the siloxane tackifying resin adhesion promotion layer. The non-tacky siloxane tackifying adhesion promotion layer is not an adhesive layer, and likewise the crosslinked siloxane layer is not tacky and is also not an adhesive layer. The adhesion of the crosslinked siloxane layer to the substrate is greater than the adhesion of the crosslinked siloxane layer to the substrate without the non-tacky siloxane tackifying adhesion promotion layer.

A wide variety of substrates are suitable for use in the multi-layer articles of this disclosure. Additionally, the substrate layers may take a wide range of shapes. In some embodiments, the substrate layer is planar, such as a sheet, plate, or film. In other embodiments, the substrate layer may be a shaped article. Examples of shapes include three-dimensional articles. The three-dimensional articles may have curved shapes such as tubes, pipes, cords, cylinders, tapered ends, straps, bands, wires, lenses, and the like.

The substrate layers may comprise a wide range of materials. The materials may be relatively rigid layers or the layers may be flexible. Suitable materials include metals, ceramics, glass, and polymeric materials. A wide range of polymeric materials are suitable. Examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and blends and mixtures thereof.

In some embodiments, the substrate layer comprises a tube, such as the tube of a stethoscope. In some embodiments, the tube is made of a metal, in other embodiments, the tube is made of a polymeric material. As will be discussed in more detail below, tubes that comprise polymeric materials can be very difficult to attach a crosslinked siloxane article, such as an ear tip, because the ear tip can readily slip off the tube. Even with physical features built into the tube and ear tip, the ear tip can still readily slip off.

The non-tacky adhesion promotion layer comprises at least one siloxane tackifying resin. While the non-tacky adhesion promotion layer may further comprise additional components, such as is described below, the siloxane tackifying resin is free of siloxane gums, siloxane fluids, and siloxane polymers. Thus, the non-tacky adhesion promotion layer is not an adhesive layer.

Siloxane tackifying resins were formerly referred to as "silicate" tackifying resins, but this terminology is typically no longer used. These siloxane tackifying resins are widely used in siloxane-based adhesives. The siloxane tackifying resins are blended with siloxane elastomers to provide siloxane adhesives, such as siloxane pressure sensitive adhesives. The level of siloxane tackifying resin present in the siloxane adhesive is often relatively high, up to 50% by weight of the adhesive composition, or even higher.

Siloxane tackifying resins are also blended with siloxane polymeric materials in other applications besides pressure sensitive adhesives. Examples include release layers, where a layer of siloxane material is used to provide a low surface energy layer. In some embodiments, low levels of siloxane tackifying resin is added to modify the release properties of the siloxane release layer. In these articles, the levels of siloxane tackifying resin present in the blend is typically quite low, generally below 10% by weight.

Suitable siloxane tackifying resins include those resins composed of the following structural units: M (i.e., monovalent $R'_3SiO_{1/2}$ units): D (i.e., divalent $R'_2SiO_{2/2}$ units): T (i.e., trivalent $R'SiO_{3/2}$ units): and Q (i.e., quaternary $SiO_{4/2}$ units): and combinations thereof. Typical exemplary siloxane resins include MQ siloxane tackifying resins, MQD siloxane tackifying resins, and MQT siloxane tackifying resins. These siloxane tackifying resins usually have a number average molecular weight in the range of 100 to 50,000 or in the range of 500 to 15,000 and generally have methyl R' groups.

MQ siloxane tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the siloxane tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M siloxane tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ siloxane tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the siloxane tackifying resin. This may be accomplished, for example, by reacting hexamethyldisilazane with the siloxane tackifying resin. Such a reaction may be catalyzed, for example, with trifluoroacetic acid. Alternatively, trimethylchlorosilane or trimethylsilylacetamide may be reacted with the siloxane tackifying resin, a catalyst not being necessary in this case.

MQD siloxane tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD siloxane tackifying resins, some of the methyl R' groups of the $R'_2SiO_{2/2}$ units ("D" units) can be replaced with vinyl ($CH_2$=CH—) groups ("$D^{Vi}$" units).

MQT siloxane tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable siloxane tackifying resins are commercially available from sources such as Dow Corning, Momentive Performance Materials, Bluestar Silicones, NuSil, and Wacker Silicones. Examples of useful MQ siloxane tackifying resins include those available under the trade designations SR-545 and SR-1000, both of which are commercially available from Momentive Performance Materials, PRO-2780 available from NuSil, and MQ-803 available from Wacker Silicones. Such resins are generally supplied in organic solvent and may be employed as received, or they may be diluted. In some embodiments, it may be desirable to utilize the siloxane tackifying resin as a solid, so the resin solution may be dried to form solid or, in some embodiments, the siloxane resin may be obtained as a solid powder.

When the siloxane tackifying resins are used as a solution, typically the resin solutions are diluted from the concentration in which they are obtained. In some embodiments, the siloxane tackifying resin solutions are diluted to 10% solids by weight, in other embodiments 5% solids by weight, or even less such a 3%, 1%, or even 0.5% by weight. Suitable solvents include: a wide range of hydrocarbon solvents including toluene, benzene, and isoparaffinic solvents such as the ISOPAR range of hydrocarbons commercially available from ExxonMobil; and alcohols such as methanol, ethanol, and isopropanol.

In other embodiments, the siloxane tackifying resins are utilized in the solid form. In some embodiments, a substrate is contacted to the solid resin by, for example, dipping the substrate into the solid resin. In other embodiments, the solid resin is rubbed onto the substrate surface. In yet other embodiments, a dispersion of the siloxane tackifying resin in a solid media where the solid media is not siloxane-based. These dispersions can be prepared by mixing the siloxane tackifying resin in the solid media, typically by stirring. Examples of suitable solid media include waxes, such as beeswax.

The article also comprises a crosslinked siloxane layer. A wide range of crosslinked siloxane materials are suitable. Frequently the crosslinked siloxane layer comprises a chemically crosslinked material. A wide range of chemically crosslinked materials are suitable and are described in greater detail below. In some embodiments, the crosslinked siloxane comprises a physically crosslinked siloxane material. A wide range of physically crosslinked siloxanes are suitable. The physical crosslinks are polymer-polymer interactions and do not involve a chemical bond. A particularly suitable interaction is the interaction called a "hydrogen bond". A hydrogen bond is the electromagnetic attraction between polar molecules in which hydrogen is bound to a larger atom, such as oxygen or nitrogen. The hydrogen bond is not a sharing of electrons, as in a covalent bond, rather it is the interaction of a hydrogen atom (which is an electron deficient group) with the lone electron pairs of an electron-rich group such as a nitrogen or oxygen atom. Examples of such hydrogen bonded polymers include block copolymers comprising polysiloxane segments linked by urethane, urea, or oxamide groups. The urethane, urea, or oxamide linking groups, contain the hydrogen atoms and lone electron pair atoms that form hydrogen bonds and thereby physically crosslink the polymer chains.

A wide range of crosslinked siloxane layers are suitable for use in the articles of this disclosure. The crosslinked siloxane layer may also have a wide range of shapes. In some embodiments, the crosslinked siloxane layer has a three-dimensional article and is a shaped article. An example of a shaped article is an ear tip suitable for placement on a device used for listening such as earbuds and stethoscopes. In some embodiments, the entire article to be contacted to the substrate layer comprises a crosslinked siloxane material, in other embodiments the article may contain an exterior layer of crosslinked siloxane material.

Crosslinked siloxanes are widely used in a wide range of articles. These materials are variously described as silicone rubbers or polysiloxane rubbers. While physically crosslinked siloxanes can be used as described above, in many embodiments, the crosslinked siloxanes are prepared by transforming linear polysiloxane polymers into a three-dimensional network by the formation of chemical bonds between adjacent polysiloxane chains. The method of crosslinking depends upon whether the polysiloxane polymers contain polymerizable functional groups. Examples of functional groups include a combination of silane groups (—Si—H) and vinyl groups (—Si—CH=CH$_2$) and are capable of being crosslinked by hydrosilylation, typically catalyzed by a metal catalyst such as a platinum catalyst.

If the polysiloxane polymers contain hydrolysable groups, the polymers can be crosslinked by a 2-step moisture initiated condensation process frequently called RTV (room temperature vulcanization). The reaction sequence is described below in Reaction Scheme I:

Reaction Scheme I

In this Scheme, R and R' are alkyl, aryl or acetyl groups, A and B comprise polysiloxane polymers or copolymers.

In many instances, the polysiloxane polymers do not contain polymerizable groups, but rather are described by Formula 1:

Formula 1 wherein R1, R2, R3, and R4 are independently selected from the group consisting of an alkyl group, or an aryl group, each R5 is an alkyl group, and n and m are integers, and at least one of m or n is not zero. In many embodiments, the polysiloxane is a polydimethylsiloxane, where each R1, R2, R3, R4, and R5 are methyl groups. Many polydimethylsiloxanes are commercially available. These polysiloxane polymers can be polymerized by free radical methods. In this polymerization method, free radicals are generated on some of the alkyl groups of the polysiloxane polymer, and these free radicals can combine with free radicals on other polysiloxane polymers to generate crosslinks. Typically, free radicals are generated through the use of peroxide initiators or by exposure to actinic radiation, such as electron beam radiation.

However crosslinking is achieved, the crosslinked polysiloxane layer comprises a matrix, which is a three dimensional polysiloxane network. As mentioned above, frequently the crosslinked siloxane layer comprises a crosslinked polydimethylsiloxane polymer.

In some embodiments, the crosslinked siloxane layer comprises just the crosslinked siloxane polymer. In other embodiments, the crosslinked siloxane layer comprises one or more non-adhesive additives. Examples of suitable additives include, for example, fillers, stabilizers, and waxes. Waxes can be particularly suitable additives as they modify the surface properties of the crosslinked siloxane layer to give the surface a softer feel.

Whether the crosslinked siloxane layer contains additives or not, the crosslinked siloxane layer typically has a low surface energy. This low surface energy can be desirable as it makes the surface resistant to staining, and chemical degradation, but it also renders the layer difficult to adhere to a wide range of substrates, especially substrates that also have a low surface energy such as many polymeric surfaces.

As mentioned above, the siloxane layer can have a wide range of shapes and sizes. In some embodiments, the crosslinked siloxane layer may be relatively two-dimensional having a length and width and relatively uniform thickness. Examples of such siloxane layers include sheets, plates, films, and the like. In other embodiments, the siloxane layer has a three-dimensional shape. Examples of such siloxane layers include a wide range of shaped articles.

This disclosure includes a wide range of multi-layer articles. In some embodiments, the substrate and the crosslinked siloxane layer are both relatively planar two-dimensional layers with a width and length and relatively uniform thickness. In these embodiments, the formed articles are likewise relatively planar two-dimensional layers with a width and length and relatively uniform thickness. Examples of such articles include those comprised of sheets, plates, films, and the like. An example of such an article is a polymeric plate to which one wishes to attach a crosslinked polysiloxane protective sheet. If one does not wish or cannot use an adhesive layer to adhere the crosslinked polysiloxane protective sheet to the polymeric plate surface, one can achieve the adhesion of the crosslinked polysiloxane protective sheet to the polymeric plate surface through the use of the adhesion promoting layer of this disclosure.

Other embodiments of articles of this disclosure are more complex and involve the use of three-dimensional substrates and three-dimensional crosslinked polysiloxane layers. An example of a three-dimensional substrate surface is a tube. Attachment to a tube can involve attachment to a portion of the surface of the tube, complete coverage of the tube surface (such as by a sleeve), or may cover the end of the tube (such as an ear tip as described above).

In some specific embodiments of this disclosure, the article is a stethoscope. These embodiments involve tubular structures and molded ear tips that attach to the tubular structures. In some embodiments, the tubular structure is a metal tube, in other embodiments the tubular structure comprises a polymeric tube. Generally, the ear tip comprises a molded crosslinked siloxane part. Typically, the tube contains protrusions that are designed to align with corresponding depressions in the molded crosslinked siloxane part to provide mechanical interlocking and hold the ear tip in place. The mechanical interlocking helps to prevent the ear tip from being pulled off the tubular structure. In some embodiments, this mechanical interlocking is viewed as providing insufficient adhesion. This can be particularly true where the tubular structure comprises a polymeric tube. It has been discovered, surprisingly, that disposing the non-tacky siloxane tackifying resin adhesion promotion layer of this disclosure on at least a portion of the tube structure and contacting a crosslinked siloxane molded part to the non-tacky siloxane tackifying resin adhesion promotion layer, greatly increases the force required to pull the molded part, such as an ear tip, off of the tubular structure. The method for testing this pull off force is described in the Examples section.

Also disclosed herein are precursor articles that comprise a substrate layer with a first major surface and a second major surface, and a non-tacky siloxane tackifying resin adhesion promotion layer disposed on at least a portion of the second major surface of the substrate layer. These precursor articles can be used to prepare the multi-layer articles described above.

A wide range of substrates and non-tacky siloxane tackifying resin adhesion promotion layers can be used to form these precursor articles as was described above.

This disclosure also includes methods for preparing articles, both precursor articles as well as the multi-layer articles described above. The method of forming a precursor article comprises providing a substrate layer with a first major surface and a second major surface, providing a siloxane tackifying resin composition, disposing the siloxane tackifying resin on at least a portion of the second major surface of the substrate layer to form a non-tacky siloxane tackifying resin adhesion promotion layer.

In some embodiments, the siloxane tackifying resin composition comprises a siloxane tackifying resin powder, a siloxane tackifying resin solution, or a dispersion of siloxane tackifying resin in a solid media, where the solid media is not a siloxane-based media.

A wide range of techniques for disposing the siloxane tackifying resin composition onto the substrate surface, depending upon the nature of the siloxane tackifying resin composition. In embodiments where the siloxane tackifying resin composition comprises a powder, the substrate may be dip coated in the powder, or the powder can be rubbed onto the surface of the substrate.

In embodiments where the siloxane tackifying resin composition comprises a siloxane tackifying resin solution, the substrate may be dip coated in the solution, the solution can be rubbed onto the surface of the substrate, or the solution can be dispensed onto the surface of the substrate without contact. In some embodiments, a tool can be used to apply the solution to the surface of the substrate. A wide range of tools can be used including wipes, sponges, and the like. In some particular embodiments, an applicator tool can be used that includes a reservoir for containing a siloxane tackifying resin solution, and a pair of sponge wheels, a lower sponge wheel and an upper sponge wheel. The lower sponge wheel is in contact with the reservoir, and is also compressed against the upper sponge wheel. The siloxane tackifying resin solution is absorbed by the lower sponge wheel and wicks into the upper sponge wheel as well. When a tubular substrate is passed between the two sponge wheels, the substrate outer surface is coated with the siloxane tackifying resin solution. In this way, the tubular surface can be coated in a single pass through the applicator tool. Additionally, a wide range of noncontact techniques can be used, including dripping techniques, spraying techniques, and printing techniques.

In embodiments where the siloxane tackifying resin composition comprises a dispersion of siloxane tackifying resin in a solid media, the dispersion may be applied directly to the substrate surface. The solid media is not a siloxane-based material. These dispersions can be prepared by mixing the siloxane tackifying resin in the solid media, typically by stirring. Examples of suitable solid media include waxes, such as beeswax.

In embodiments where the siloxane tackifying resin composition comprises a siloxane tackifying resin solution, the method further comprises drying. Drying can be achieved by permitting the solvent to evaporate under ambient conditions or drying can be accelerated through the use of heat, for example by the use of an oven. In some embodiments, the siloxane tackifying resin solution can be dried to form the precursor article, or the layer of the siloxane tackifying resin solution can remain undried.

A wide array of substrates is suitable for use in the preparation of the precursor articles of this disclosure, as described above. Examples of substrate layers include a metal layer, a polymeric layer, a ceramic layer, or a glass layer. The substrate layer may be in a variety of shapes, as described above.

This disclosure also includes methods for preparing the multi-layer articles described above. The method may comprise many of the same steps for preparing a precursor article as described above. The method comprises providing a substrate layer with a first major surface and a second major surface, providing a siloxane tackifying resin composition, disposing the siloxane tackifying resin on at least a portion of the second major surface of the substrate layer to form a non-tacky siloxane tackifying resin adhesion promotion layer, as described above. The method further comprises providing a crosslinked siloxane layer, wherein the crosslinked siloxane layer is not an adhesive layer, and contacting the crosslinked siloxane layer to the non-tacky siloxane tackifying resin adhesion promotion layer to form a multi-layer article. The adhesion of the crosslinked siloxane layer to the substrate is greater than the adhesion of the crosslinked siloxane layer to the substrate without the non-tacky siloxane tackifying adhesion promotion layer.

In some embodiments, the siloxane tackifying resin composition comprises a siloxane tackifying resin powder, a siloxane tackifying resin solution, or a dispersion of siloxane tackifying resin in a solid media, where the solid media is not a siloxane-based media.

A wide range of techniques for disposing the siloxane tackifying resin composition are suitable, depending upon the nature of the siloxane tackifying resin composition. In embodiments where the siloxane tackifying resin composition comprises a powder, the substrate may be dip coated in the powder, or the powder can be rubbed onto the surface of the substrate.

In embodiments where the siloxane tackifying resin composition comprises a siloxane tackifying resin solution, the substrate may be dip coated in the solution, the solution can be rubbed or coated onto the surface of the substrate, or the solution can be dispensed onto the surface of the substrate without contact. In some embodiments, a tool can be used to apply the solution to the surface of the substrate. A wide range of tools can be used including wipes, sponges, and the like. In some particular embodiments, an applicator tool can be used that includes a reservoir for containing a siloxane tackifying resin solution, and a pair of sponge wheels, a lower sponge wheel and an upper sponge wheel. The lower sponge wheel is in contact with the reservoir, and is also compressed against the upper sponge wheel. The siloxane tackifying resin solution is absorbed by the lower sponge wheel and wicks into the upper sponge wheel as well. When a tubular substrate is passed between the two sponge wheels, the substrate outer surface is coated with the siloxane tackifying resin solution. In this way, the tubular surface can be coated in a single pass through the applicator tool. Additionally, a wide range of noncontact techniques can be used, including dripping techniques, spraying techniques, and printing techniques.

In embodiments where the siloxane tackifying resin composition comprises a dispersion of siloxane tackifying resin in a solid media, the dispersion may be applied directly to the substrate surface. The solid media is not a siloxane-based material. These dispersions can be prepared by mixing the siloxane tackifying resin in the solid media, typically by stirring. Examples of suitable solid media include waxes, such as beeswax.

In embodiments where the siloxane tackifying resin comprises a siloxane tackifying resin solution, the method further comprises drying. Drying can be achieved by permitting the solvent to evaporate under ambient conditions, or drying can be accelerated through the use of heat, for example by the use of an oven. In some embodiments, the siloxane tackifying resin solution is dried prior to contacting the crosslinked siloxane layer to the siloxane tackifying resin layer. In other embodiments, the siloxane tackifying resin solution is not dried prior to contacting the crosslinked siloxane layer to the siloxane tackifying resin layer. In these embodiments, the presence of solvent on the substrate layer can function as a lubricant to aid the disposing of crosslinked siloxane layer on the siloxane tackifying resin layer.

A wide array of substrates is suitable for use in the preparation of the multi-layer articles of this disclosure, as described above. Examples of substrate layers include a metal layer, a polymeric layer, a ceramic layer, or a glass layer. The substrate layer may be in a variety of shapes, as described above.

A wide array of crosslinked siloxane layers is suitable in preparing the multi-layer articles of this disclosure. In some embodiments, the crosslinked siloxane layer comprises a crosslinked polydimethylsiloxane polymer.

In some embodiments, the substrate layer comprises a metal or polymeric tube, and the crosslinked siloxane layer comprises a molded part. Examples of such embodiments include stethoscopes, especially ones were the stethoscope includes a polymeric tube and molded ear tips comprising crosslinked siloxane polymers.

Figure 1:
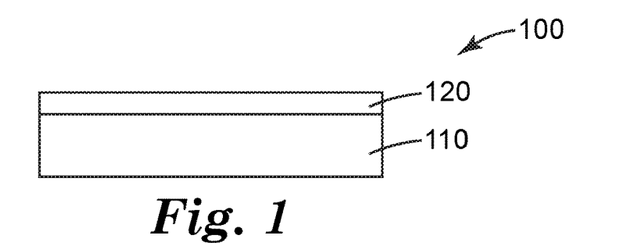
FIG. 1 shows a cross-sectional view of an embodiment of a precursor article of this disclosure.

The articles and methods of this disclosure may be further understood with the figures. FIG. 1 shows a cross sectional view of a precursor article 100 of this disclosure. In FIG. 1, substrate 110 has non-tacky adhesion promotion layer 120 disposed on its surface.

Figure 2:
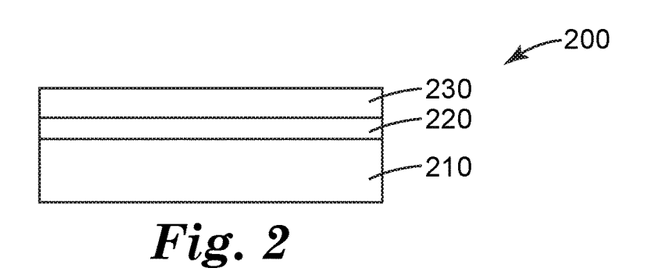
FIG. 2 shows a cross-sectional view of an embodiment of a multi-layer article of this disclosure.

FIG. 2 shows a cross sectional view of a multi-layer article 200 of this disclosure. In FIG. 2, substrate 210 has non-tacky adhesion promotion layer 220, and crosslinked siloxane layer 230.

Figure 3:
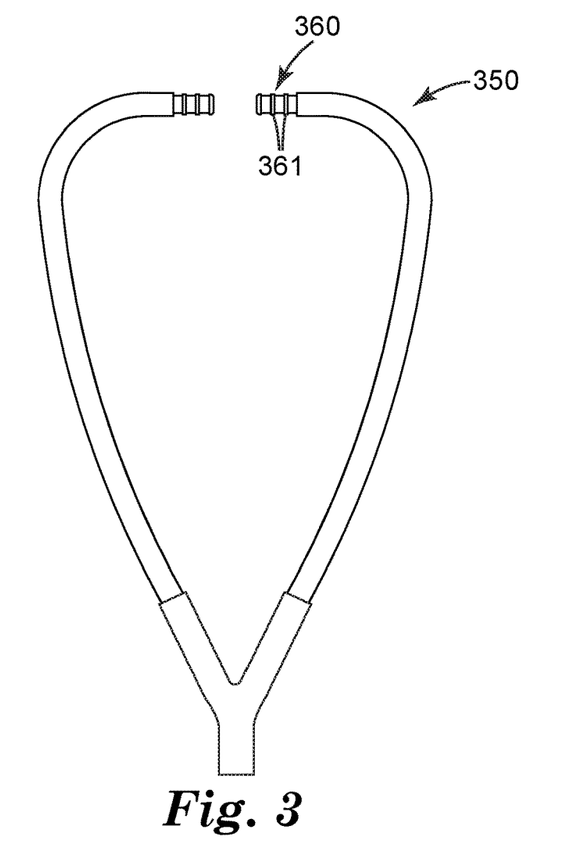
FIG. 3 is a perspective view of the tubular portion of an article of this disclosure.
Figure 4:
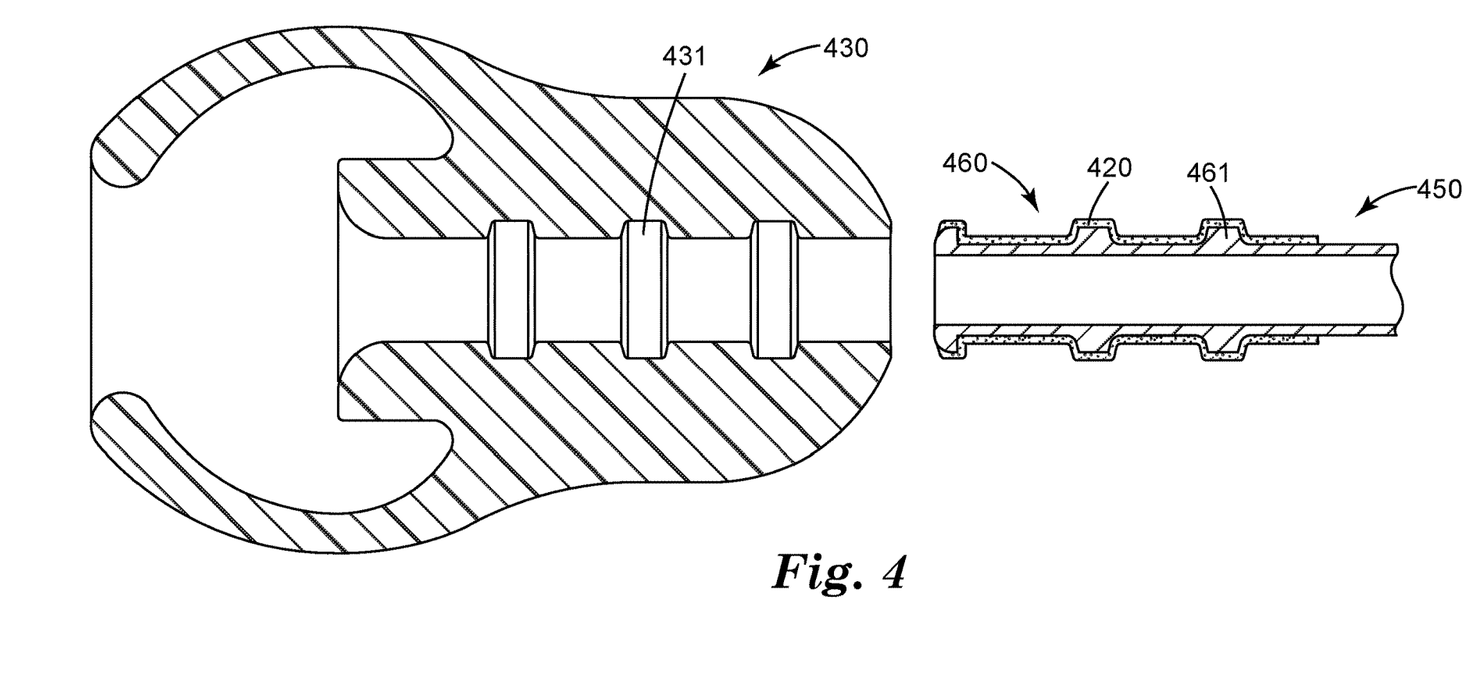
FIG. 4 is a cross-sectional view of a molded ear tip portion of an article of this disclosure and the corresponding tubular portion to which the molded ear tip portion is designed to attach.
Figure 5:
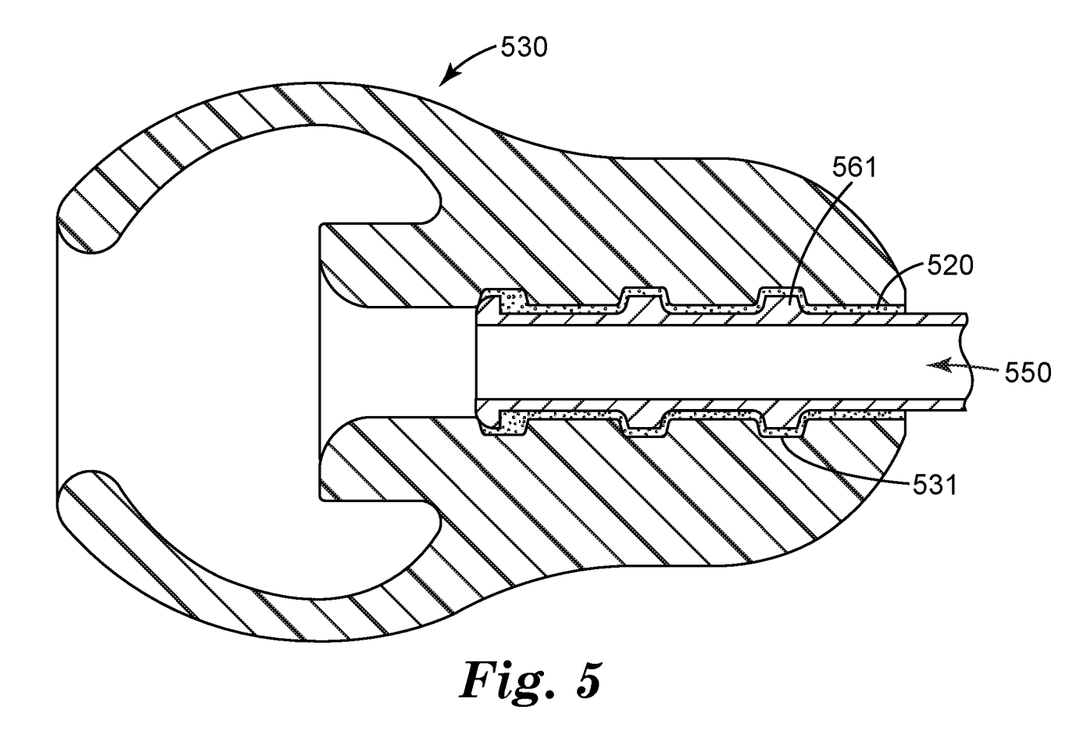
FIG. 5 is a cross-sectional view of a portion of an article of this disclosure.

FIGS. 3-5 show stethoscope articles of this disclosure. In FIG. 3, the tubular portion of the stethoscope is shown as curved tubular portion 350 with section 360 designed to receive an ear tip. Section 360 includes protrusions 361.

FIG. 4 shows a portion of the tubular portion of the stethoscope 450 and molded ear tip article 430. The tubular portion 450 has section 460 with protrusions 461. The surface of section 460 has non-tacky adhesion promotion layer 420. The molded ear tip article 430 includes depressions 431, designed to mechanically engage with the protrusions 461 of the tubular portion 450 of the stethoscope.

FIG. 5 shows a portion of an assembled stethoscope article with ear tip 530 attached to the tubular portion 550. Protrusions 561 on tubular portion 550 are engaged with depression 531 of ear tip 530. Non-tacky adhesion promotion layer 520 is located between the surface of the ear tip article 530 and the tubular portion 550.

Figure 6:
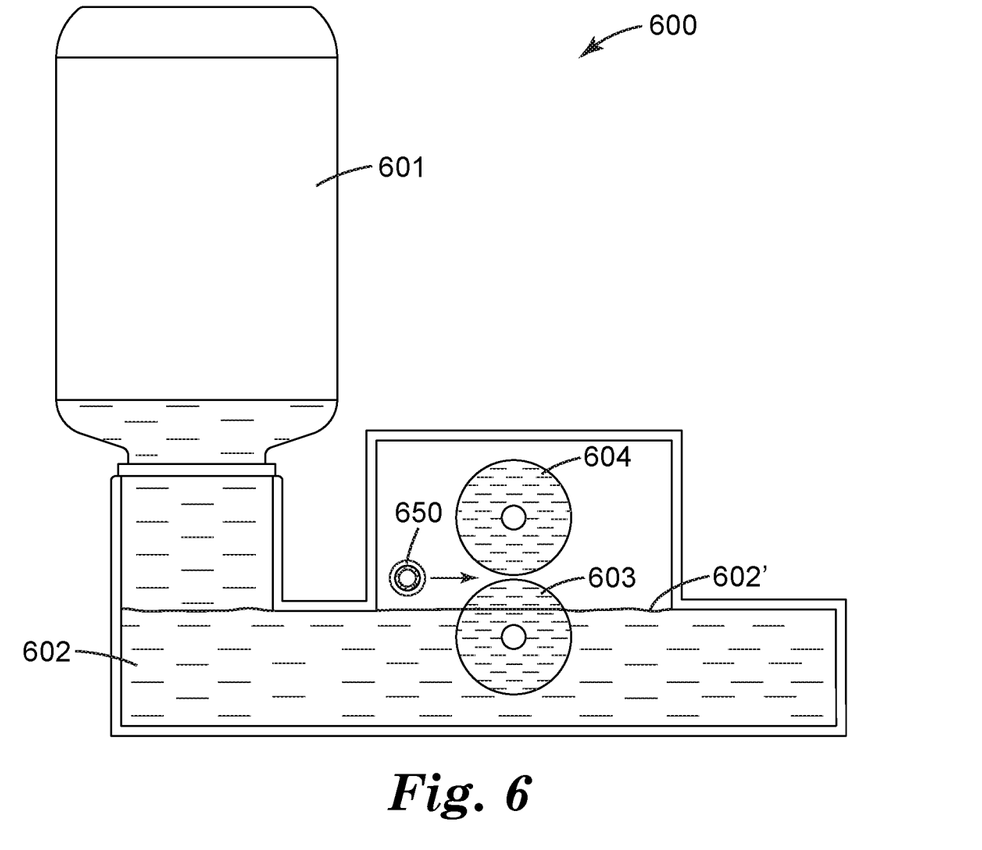
FIG. 6 is a perspective view of an application tool for preparing articles of this disclosure.

FIG. 6 shows a perspective view of an applicator article that can be used to apply a solution of a non-tacky adhesion promotion material to a tubular article, such as a stethoscope. The applicator 600 comprises a fluid container 601 that is in fluid contact with a fluid reservoir 602. Fluid reservoir 602 is filled with fluid to level 602'. Fluid reservoir 602 is in contact with first lower sponge wheel 603. Lower sponge wheel 603 is in compression contact with second upper sponge wheel 604. FIG. 6 further shows a cross-sectional view of a portion of stethoscope article 650 which is pulled between first lower sponge wheel 603 and second upper sponge wheel 604 in the direction indicated by the arrow to produce a coating on the outer surface of stethoscope article 650.

The current disclosure includes the following embodiments:

Among the embodiments are articles. Embodiment 1 includes an article comprising: a substrate layer with a first major surface and a second major surface; a non-tacky siloxane tackifying resin adhesion promotion layer disposed on at least a portion of the second major surface of the substrate layer; and a crosslinked siloxane layer with a first major surface and a second major surface, wherein the first major surface of the crosslinked siloxane layer is in contact with the siloxane tackifying resin adhesion promotion layer, wherein the crosslinked siloxane layer is not an adhesive layer and wherein the adhesion of the crosslinked siloxane layer to the substrate is greater than the adhesion of the crosslinked siloxane layer to the substrate without the non-tacky siloxane tackifying adhesion promotion layer.

Embodiment 2 is the article of embodiment 1, wherein the non-tacky siloxane tackifying resin adhesion promotion layer comprises an MQ tackifying resin that is free of siloxane gums, siloxane fluids, and siloxane polymers.

Embodiment 3 is the article of embodiment 1 or 2, wherein the non-tacky siloxane tackifying resin adhesion promotion layer further comprises a solid media wherein the solid media is not siloxane-based.

Embodiment 4 is the article of any of embodiments 1-3, wherein the substrate layer comprises a metal layer, a polymeric layer, a ceramic layer, or a glass layer.

Embodiment 5 is the article of embodiment 4, wherein the substrate layer comprises a polymeric layer comprising a polyolefin, a polyacrylate, a polyester, a polyurethane, or a combination thereof.

Embodiment 6 is the article of any of embodiments 1-5, wherein the crosslinked siloxane layer comprises a crosslinked polydimethylsiloxane polymer.

Embodiment 7 is the article of any of embodiments 1-6, wherein the crosslinked siloxane layer further comprises at least one non-adhesive additive.

Embodiment 8 is the article of embodiment 7, wherein the at least one non-adhesive additive comprises a wax.

Embodiment 9 is article of any of embodiments 1-8, wherein the substrate layer comprises a metal or polymeric tube, and the crosslinked siloxane layer comprises a molded part.

Also disclosed are precursor articles. Embodiment 10 includes an article comprising: a substrate layer with a first major surface and a second major surface; a non-tacky siloxane tackifying resin adhesion promotion layer disposed on at least a portion of the second major surface of the substrate layer; such that contact of the siloxane tackifying resin adhesion promotion layer with a first major surface of a crosslinked siloxane layer, wherein the crosslinked siloxane layer is not an adhesive layer, the adhesion of the crosslinked siloxane layer to the substrate is greater than the adhesion of the crosslinked siloxane layer to the substrate without the non-tacky siloxane tackifying adhesion promotion layer.

Embodiment 11 is the article of embodiment 10, wherein the non-tacky siloxane tackifying resin adhesion promotion layer comprises an MQ tackifying resin that is free of siloxane gums, siloxane fluids, and siloxane polymers.

Embodiment 12 is the article of embodiment 10 or 11, wherein the substrate layer comprises a metal layer, a polymeric layer, a ceramic layer, or a glass layer.

Embodiment 13 is the article of embodiment 12, wherein the substrate layer comprises a polymeric layer comprising a polyolefin, a polyacrylate, a polyester, a polyurethane, or a combination thereof.

Embodiment 14 is the article of any of embodiments 10-13, wherein the non-tacky siloxane tackifying resin adhesion promotion layer further comprises a solid media, wherein the solid media is not siloxane-based.

Also disclosed are methods of preparing articles. Embodiment 15 includes a method of preparing an article, comprising: providing a substrate layer with a first major surface and a second major surface; providing a siloxane tackifying resin composition; providing a crosslinked siloxane layer, wherein the crosslinked siloxane layer is not an adhesive layer; disposing the siloxane tackifying resin of at least a portion of the second major surface of the substrate layer to form a non-tacky siloxane tackifying resin adhesion promotion layer; and contacting the crosslinked siloxane layer to the non-tacky siloxane tackifying resin adhesion promotion layer, to form a multi-layer article wherein the adhesion of the crosslinked siloxane layer to the substrate is greater than the adhesion of the crosslinked siloxane layer to the substrate without the non-tacky siloxane tackifying adhesion promotion layer.

Embodiment 16 is the method of embodiment 15, wherein the siloxane tackifying resin composition comprises a siloxane tackifying resin powder, a siloxane tackifying resin solution, or a dispersion of siloxane tackifying resin in a solid media, where the solid media is not a siloxane-based media.

Embodiment 17 is the method of embodiment 15 or 16, wherein the siloxane tackifying resin comprises a siloxane tackifying resin solution, and wherein forming a non-tacky siloxane tackifying resin adhesion promotion layer further comprises drying.

Embodiment 18 is the method of embodiment 17, wherein the siloxane tackifying resin comprises a siloxane tackifying resin solution, and disposing the siloxane tackifying resin solution comprises applying the siloxane tackifying resin solution with an application tool comprising a fluid reservoir containing the siloxane tackifying resin solution, a first sponge wheel in fluid contact with the fluid reservoir, and a second sponge wheel in compression contact with the first sponge wheel, such that a tubular article passed between the first and second sponge wheels is coated with eth siloxane tackifying resin solution.

Embodiment 19 is the method of embodiment 17, wherein the solid media comprises a wax.

Embodiment 20 is the method of any of embodiments 15-19, wherein the substrate layer comprises a metal layer, a polymeric layer, a ceramic layer, or a glass layer.

Embodiment 21 is the method of embodiment 20, wherein the substrate layer comprises a polymeric layer comprising a polyolefin, a polyacrylate, a polyester, a polyurethane, or a combination thereof.

Embodiment 22 is the method of any of embodiments 15-21, wherein the crosslinked siloxane layer comprises a crosslinked polydimethylsiloxane polymer.

Embodiment 23 is the method of any of embodiments 15-22, wherein the substrate layer comprises a metal or polymeric tube, and the crosslinked siloxane layer comprises a molded part.

Also disclosed are stethoscopes. Embodiment 24 includes a stethoscope comprising a tubular stethoscope portion and an ear tip, wherein the ear tip is attached to the tubular portion, wherein the ear tip comprises a crosslinked siloxane polymer, and wherein a non-tacky siloxane tackifying resin adhesion promotion layer is disposed on the tubular portion, and the adhesion of the crosslinked siloxane ear tip to the tubular portion is greater than the adhesion of the crosslinked siloxane ear tip to the tubular portion without the non-tacky siloxane tackifying adhesion promotion layer.

Embodiment 25 is the stethoscope of embodiment 24, wherein the tubular portion comprises a polymeric layer comprising a polyolefin, a polyacrylate, a polyester, a polyurethane, or a combination thereof.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo., unless otherwise noted.

TABLE 1

| | Materials. | |
| --- | --- | --- |
| Material | Details | Supplier (Location) |
| Alumina | AX10-75 powder, 8 micrometers | Micron Co. Ltd (Himeji, Japan) |
| Silica | Nalco 2327 colloidal silica sol, ammonia-stabilized, 40% solids, 20 nm | Nalco-Ecolab (Naperville, IL) |
| Silicone resin | Tospearl 145 powder | Momentive (Waterford, NY) |
| MQ resin-1 | MQ 803 TF Silicone Resin Powder | Wacker Chemical Corp. (Adrian, MI) |
| MQ resin-2 | MQ 803 solution in isopropanol (16.19% solids) | Wacker Chemical Corp. (Adrian, MI) |

TABLE 1-continued

Materials.

| Material | Details | Supplier (Location) |
|---|---|---|
| MQ resin-3 | PRO2780 solution in toluene | Nusil Technology LLC (Capinteria, CA) |
| MQ resin-4 | SR545 solution in toluene (60.53 wt % solids) | Momentive (Waterford, NY) |
| Beeswax | B0850-454G solid block | Aqua Solutions (Deer Park, TX) |
| Isopropanol (IPA) | | Sigma-Aldrich (St. Louis, MO) |

Test Methods

Ear tip pull force was measured with a calibrated tensile testing machine. The test method utilized a load cell with a clamp and washer to pull the eartip off of its tube and measure the pull force profile. The peak pull force ($F_{max}$) was measured using a Zwick tensile tester (ZwickRoell LP, Kennesaw, Ga.). The test was performed at a machine speed of 10 inches per minute (25.4 centimeters/minute) to a displacement of 0.5 inches (1.3 centimeters) (a force sufficient to remove the ear tip). The $F_{max}$ required to remove the ear tip was recorded. The reported $F_{max}$ is the average of at least three replicates unless noted otherwise.

Stethoscope Ear Tubes

The stethoscope ear tubes used in most of the examples were fabricated from polypropylene (PP) and are used, for example, in the 3M Single-Patient Stethoscope, which is available from 3M Company, St. Paul, Minn. In Comparative Example 31 and Example 33, the stethoscope ear tubes were fabricated from aluminum and are used in, for example, the Littmann Classic III Stethoscope, which is available from 3M Company, St. Paul, Minn.

Stethoscope Ear Tips

The stethoscope ear tips used in all examples are those used in, for example, the 3M Single-Patient and Littmann Classic III Stethoscopes, which are available from 3M Company, St. Paul, Minn. The ear tips were fabricated using a crosslinked silicone resin and in most examples were coated with PARYLENE N. The ear tips used in Example 29 were uncoated.

Effect of Different Treatments on the Force Required to Remove Ear Tips

Table 2 presents the effect of different treatments on the force required to remove ear tips from ear tubes. Materials in solid form were applied to ear tubes by dry dipping (dipping in powder and shaking off excess powder) or by dry rubbing (in the case of a stick of solid material). Materials in solution or sol form were applied by wet dipping. Ear tips were then either applied straightaway to the treated ear tubes while article was wet (wet application), or the treated ear tube was allowed to dry before an ear tip was applied dry (dry application). The force required to remove the ear tip from the ear tube was measured as described under Test Method. It can be seen from the data in Table 2 that alumina powder, silica sol, and silicone resin powder (Comparative Examples 2-5) either had minimal effect on the force required to remove ear tips from ear tubes or reduced the force required, when compared to untreated ear tubes (Comparative Example 1). As shown by Examples 6-9, the application of MQ resin resulted in a large increase in the force required, regardless of the resin source, solvent used, and method of application.

TABLE 2

Force required to remove ear tips.

| | Treatment | Application | Force $F_{max}$ lb$_f$ (Newtons) |
|---|---|---|---|
| Comparative Example 1 | None | NA | 7.60 (33.8) |
| Comparative Example 2 | Alumina powder | Dry dip | 4.24 (18.9) |
| Comparative Example 3 | Silica sol | Wet dip, wet application | 7.87 (35.0) |
| Comparative Example 4 | Silica sol | Wet dip, dry application | 3.37 (15.0) |
| Comparative Example 5 | Silicone resin powder | Dry dip | 3.14 (14.0) |
| Example 6 | MQ resin-1 | Dry dip | 12.0 (53.4) |
| Example 7 | MQ resin-2 | Wet dip, wet application | 13.2 (58.7) |
| Example 8 | MQ resin-2 | Wet dip, dry application | 11.2 (49.8) |
| Example 9 | MQ resin-3 | Wet dip, dry application | 10.2 (45.4) |

Effect of Different Treatments on the Force Required to Apply Ear Tips

Ease of application of ear tips to ear tubes immediately after treatment was assessed qualitatively as easy (comparable to control with no treatment), intermediate, or difficult (requiring considerable physical effort). The ear tubes were treated as described in Table 3 under "Application" using the processes described above. The results are presented in Table 3.

TABLE 3

Ease of application of ear tips.

| | Treatment | Application | Comment |
|---|---|---|---|
| Comparative Example 10 | None | NA | Easy |
| Comparative Example 11 | Alumina powder | Dry dip | Easy |
| Comparative Example 12 | Silica sol | Wet dip, wet application | Easy |
| Comparative Example 13 | Silica sol | Wet dip, dry application | Intermediate |
| Comparative Example 14 | Silicone resin powder | Dry dip | Easy |
| Example 15 | MQ Resin-1 | Dry dip | Difficult |
| Example 16 | MQ Resin-2 | Wet dip, wet application | Easy |
| Example 17 | MQ Resin-2 | Wet dip, dry application | Difficult |
| Example 18 | MQ Resin-3 | Wet dip, wet application | Easy |
| Example 19 | MQ Resin-3 | Wet dip, dry application | Difficult |
| Example 20 | MQ Resin-4 | Wet dip, wet application | Easy |
| Example 21 | MQ Resin-4 | Wet dip, dry application | Difficult |

TABLE 3-continued

Ease of application of ear tips.

| | Treatment | Application | Comment |
|---|---|---|---|
| Comparative Example 22 | Bees wax | Dry rub | Easy |
| Example 23 | Bees wax-MQ resin stick | Dry rub | Difficult |

Preparation of Beeswax Application Stick

A mixture of beeswax (14.88 g), MQ Resin-1 (15.00 g) and toluene (70 g) was stirred at room temperature for 8 hours to give a cloudy solution. This solution was poured into a silicone mold and the solvent was removed by heating for 3 hours at 80° C. in a solvent-rated oven. A block of waxy solid was obtained, which was used as an applicator to apply MQ resin.

Effect of Dilute Solutions Applied by a Drop Method

A solution of 5 wt % MQ Resin-1 dissolved in isopropanol was made by stirring the resin and solvent together until a uniform solution was obtained. Either 1 or 2 drops of the solution was placed on the ear tube part and the ear tip was immediately placed on the wet ear tube. The applied solution ran down the ear tube and spread uniformly over the end of the ear tube when the ear tip was pushed on.

The force required to subsequently remove the ear tip from the ear tube is reported in Table 4.

TABLE 4

Force ($F_{max}$ lb$_f$) (Newton values are in parentheses) required to remove ear tip from ear tube after the application of 1 or 2 drops of isopropanol solution containing MQ resin.

| | Example 24 | Example 25 |
|---|---|---|
| | Isopropanol solution | |
| | 1 drop | 2 drops |
| trial 1 | 7.64 (34.0 N) | 8.77 (39.0 N) |
| trial 2 | 11 (48.9 N) | 6.97 (31.0 N) |
| trial 3 | 8.49 (37.8 N) | 9.76 (43.4 N) |
| trial 4 | 7.46 (33.2 N) | 10.3 (45.8 N) |
| trial 5 | 10.4 (46.3 N) | 9.11 (40.5 N) |
| average | 9.00 (40.0 N) | 8.98 (39.9 N) |
| minimum | 7.46 (33.2 N) | 6.97 (31.0 N) |
| StDev | 1.62 (7.20 N) | 1.27 (5.65 N) |

Effect of Ear Tip Modification on Removal Force

The force ($F_{max}$ lb$_f$) required to remove ear tips from ear tubes was investigated as a function of ear tip modification. It was observed that the force required to remove ear tips from ear tubes decreased with time, and the impact of this effect was evaluated by applying the ear tip to the ear tube, followed by ageing the assembled combination. In Table 5, "aged" refers to ear tips applied to ear tubes and then stored at ambient laboratory conditions for at least two weeks prior to measurement of the force required to remove the ear tip from the ear tube. In Comparative Example 26, no modification was made of the ear tube or ear tip prior to application. In Example 27, "PP, 5% MQ aged" refers to an ear tip applied wet to a polypropylene ear tube that had been dipped into a solution of 5 wt % MQ Resin-1 dissolved in isopropanol, followed by ageing. Example 28 was prepared and aged in the same fashion as Example 27, but before force testing, the ear tip was rotated on the ear tube to ensure that no structural adhesive bond had formed between the ear tip and the ear tube. Example 29 was prepared as Example 27, except that the ear tip did not have the PARYLENE N coating. As an additional control, Comparative Example 30 was prepared as Example 27, but the isopropanol that the ear tube was dipped into contained no MQ resin. Also, aluminum ear tubes were used for Comparative Example 31 and Example 32. From the data presented in Table 5, it can be concluded that treatment with MQ resin increases the force required to remove the ear tip from the ear tube for ear tubes fabricated from both polypropylene and aluminum. It can also be seen that using ear tips having no PARYLENE N coating has no significant effect on the force required to remove the ear tips from the ear tubes. Further, treating an ear tube with isopropanol containing no MQ resin does not increase the force required to remove an ear tip. Lastly, twisting the ear tip on the ear tube after ageing but before testing did not reduce the force required to remove the ear tip, suggesting that the effect is not a glue bond but an increased tackiness due to interfacial effects.

TABLE 5

Force ($F_{max}$ lb$_f$) required to remove ear tip from ear tube.

| | Comparative Example 26 PP, aged | Example 27 PP, 5% MQ, aged | Example 28 PP, 5% MQ, aged, twist | Example 29 PP, 5% MQ, aged, no parylene N | Comparative Example 30 PP, IPA only, aged | Comparative Example 31 Al Control, aged | Example 32 Al, 5% MQ, aged |
|---|---|---|---|---|---|---|---|
| trial 1 | 4.55 (20.2 N) | 8.21 (36.5 N) | 9.07 (40.3 N) | 8.13 (36.2 N) | 4.51 (20.1 N) | 14.1 (62.7 N) | 20.8 (92.5 N) |
| trial 2 | 4.71 (21.0 N) | 10.5 (46.7 N) | 7.93 (35.3 N) | 7.51 (33.4 N) | 3.87 (17.2 N) | 13.8 (61.4 N) | 16 (71.2 N) |
| trial 3 | 5.55 (24.7 N) | 7.04 (31.3 N) | 8.64 (38.4 N) | 7.68 (34.2 N) | 4.92 (21.9 N) | 15.6 (69.4 N) | 19 (84.5 N) |
| trial 4 | 6.34 (28.2 N) | 6.82 (30.3 N) | 8.65 (38.5 N) | 8.39 (37.3 N) | 4.63 (20.6 N) | 14.7 (65.4 N) | 18.5 (82.3 N) |
| trial 5 | 5.25 (23.4 N) | 7.56 (33.6 N) | 9.03 (40.2 N) | 8.37 (37.2 N) | 5.04 (22.4 N) | 15.4 (68.5 N) | 18.1 (80.5 N) |
| trial 6 | 6.52 (29.0 N) | 8.86 (39.4 N) | 9.42 41.9 N) | 6.29 (28.0 N) | 5.07 (22.6 N) | 13.7 (60.9 N) | 20.1 (89.4 N) |
| average | 5.28 (23.5 N) | 8.03 (35.7 N) | 8.66 (38.5 N) | 8.02 (35.7 N) | 4.59 (20.4 N) | 14.72 (65.5 N) | 18.48 (82.2 N) |
| minimum | 4.55 (20.2 N) | 6.82 (30.3 N) | 7.93 (35.3 N) | 7.51 (33.4 N) | 3.87 (17.2 N) | 13.8 (61.4 N) | 16 (71.2 N) |
| StDev | 0.72 (3.2 N) | 1.48 (6.6 N) | 0.46 (2.0 N) | 0.40 (1.8 N) | 0.46 (2.0 N) | 0.79 (3.5 N) | 1.73 (7.7 N) |

The impact of MQ solution concentration was examined. Using the processes described above, solutions of MQ resin in isopropanol (IPA) were prepared at 0.5%, 1%, 2.5%, and 5% by weight were prepared using MQ Resin-1 and used to treat polypropylene ear tubes. The force required to remove the ear tips after ageing are reported in Table 6, with comparison to control samples that had been prepared using isopropanol containing no MQ resin.

TABLE 6

Force ($F_{max}$ $lb_f$) required to remove ear tip from ear tube after treatment with varying concentrations of MQ resin solution.

|  | Comparative Example 30 PP, IPA only, aged | Example 33 PP, 0.5% MQ, aged | Example 34 PP, 1% MQ, aged | Example 35 PP, 2.5% MQ, aged | Example 36 PP, 5% MQ, aged |
|---|---|---|---|---|---|
| trial 1 | 4.51 (20.1 N) | 5.18 (23.0 N) | 5.28 (23.5 N) | 7.26 (32.3 N) | 9.09 (40.4 N) |
| trial 2 | 3.87 (17.2 N) | 4.87 (21.7 N) | 7.18 (31.9 N) | 5.18 (23.0 N) | 9.22 (41.0 N) |
| trial 3 | 4.92 (21.9 N) | 4.94 (22.0 N) | 3.63 (16.1 N) | 7.91 (35.2 N) | 6.58 (29.3 N) |
| trial 4 | 4.63 (20.6 N) | 4.41 (19.6 N) | 6.89 (30.6 N) | 11.1 (49.4 N) | 10.9 (48.5 N) |
| trial 5 | 5.04 (22.4 N) | 4.65 (20.7 N) | 4.93 (21.9 N) | 7.95 (35.4 N) | 9.19 (40.9 N) |
| trial 6 | 5.07 (22.6 N) | 5.3 (23.6 N) | 5.1 (22.7 N) | 6.43 (28.6 N) | 8.27 (36.8 N) |
| average | 4.59 (20.4 N) | 4.81 (21.4 N) | 5.58 (24.8 N) | 7.88 (35.1 N) | 9.00 (40.0 N) |
| minimum | 3.87 (17.2 N) | 4.41 (19.6 N) | 3.63 (16.1 N) | 5.18 (23.0 N) | 6.58 (29.3 N) |
| StDev | 0.46 (2.0 N) | 0.29 (1.3 N) | 1.47 (6.5 N) | 2.12 (9.4 N) | 1.55 (6.9 N) |

Example 37: Ear Tube Treated with Beeswax Applicator Stick

An ear tube was treated using the MQ resin-containing beeswax applicator stick prepared above and compared to an ear tube treated with beeswax containing no MQ resin. The force required to remove an ear tip from the ear tube treated with the MQ resin/beeswax formulation was 5.6 $lb_f$ (24.9 N), while the force required for the control treated with beeswax was 4.51 $lb_f$ (20.1 N).

Example 38: Application of MQ Resin Solution Using a Solution Dispensing Apparatus An apparatus having two pairs of abutting sponge discs and a reservoir for MQ resin solution was fabricated. The device automatically fed the MQ resin solution to the sponge discs, which were arranged so that each pair of discs had their curved outer surfaces contacting each other. The reservoir was filled with MQ resin solution and an ear tube was pulled through the apparatus, with each end of the ear tube passing between one of the pairs of discs. The apparatus applied a uniform coat of MQ resin solution to the desired portion of the ear tube, test specimens were prepared, and the MQ resin applied in this manner was found to increase the force required to remove ear tips in the manner desired.

What is claimed is:

1. An article comprising:
   a substrate layer with a first major surface and a second major surface;
   a non-tacky siloxane tackifying resin adhesion promotion layer disposed on at least a portion of the second major surface of the substrate layer, wherein the non-tacky siloxane tackifying resin adhesion promotion layer is free of siloxane gums, siloxane fluids, and siloxane polymers; and
   a crosslinked siloxane layer with a first major surface and a second major surface, wherein the first major surface of the crosslinked siloxane layer is in contact with the siloxane tackifying resin adhesion promotion layer, wherein the crosslinked siloxane layer is not an adhesive layer and wherein the adhesion of the crosslinked siloxane layer to the substrate is greater than the adhesion of the crosslinked siloxane layer to the substrate without the non-tacky siloxane tackifying adhesion promotion layer.

2. The article of claim 1, wherein the non-tacky siloxane tackifying resin adhesion promotion layer comprises an MQ tackifying resin that is free of siloxane gums, siloxane fluids, and siloxane polymers.

3. The article of claim 1, wherein the non-tacky siloxane tackifying resin adhesion promotion layer further comprises a solid media wherein the solid media is not siloxane-based.

4. The article of claim 1, wherein the crosslinked siloxane layer comprises a crosslinked polydimethylsiloxane polymer.

5. The article of claim 1, wherein the substrate layer comprises a metal or polymeric tube, and the crosslinked siloxane layer comprises a molded part.

6. The article of claim 1, wherein the substrate layer comprises a metal layer, a polymeric layer, a ceramic layer, or a glass layer.

7. The article of claim 6, wherein the substrate layer comprises a polymeric layer comprising a polyolefin, a polyacrylate, a polyester, a polyurethane, or a combination thereof.

8. The article of claim 1, wherein the crosslinked siloxane layer further comprises at least one non-adhesive additive.

9. The article of claim 8, wherein the at least one non-adhesive additive comprises a wax.

10. An article comprising:
    a substrate layer with a first major surface and a second major surface;
    a non-tacky siloxane tackifying resin adhesion promotion layer disposed on at least a portion of the second major surface of the substrate layer, wherein the non-tacky siloxane tackifying resin adhesion promotion layer is free of siloxane gums, siloxane fluids, and siloxane polymers; such that contact of the siloxane tackifying resin adhesion promotion layer with a first major surface of a crosslinked siloxane layer, wherein the crosslinked siloxane layer is not an adhesive layer, the adhesion of the crosslinked siloxane layer to the substrate is greater than the adhesion of the crosslinked siloxane layer to the substrate without the non-tacky siloxane tackifying adhesion promotion layer.

11. The article of claim 10, wherein the non-tacky siloxane tackifying resin adhesion promotion layer comprises an MQ tackifying resin that is free of siloxane gums, siloxane fluids, and siloxane polymers.

12. The article of claim 10, wherein the substrate layer comprises a metal layer, a polymeric layer, a ceramic layer, or a glass layer.

13. A method of preparing an article, comprising:
providing a substrate layer with a first major surface and a second major surface;
providing a siloxane tackifying resin composition, wherein the siloxane tackifying resin composition is free of siloxane gums, siloxane fluids, and siloxane polymers;
providing a crosslinked siloxane layer, wherein the crosslinked siloxane layer is not an adhesive layer;
disposing the siloxane tackifying resin of at least a portion of the second major surface of the substrate layer to form a non-tacky siloxane tackifying resin adhesion promotion layer; and
contacting the crosslinked siloxane layer to the non-tacky siloxane tackifying resin adhesion promotion layer, to form a multi-layer article wherein the adhesion of the crosslinked siloxane layer to the substrate is greater than the adhesion of the crosslinked siloxane layer to the substrate without the non-tacky siloxane tackifying adhesion promotion layer.

14. The method of claim 13, wherein the siloxane tackifying resin comprises a siloxane tackifying resin solution, and wherein forming a non-tacky siloxane tackifying resin adhesion promotion layer further comprises drying.

15. The method of claim 13, wherein the siloxane tackifying resin comprises a siloxane tackifying resin solution, and disposing the siloxane tackifying resin solution comprises applying the siloxane tackifying resin solution with an application tool comprising a fluid reservoir containing the siloxane tackifying resin solution, a first sponge wheel in fluid contact with the fluid reservoir, and a second sponge wheel in compression contact with the first sponge wheel, such that a tubular article passed between the first and second sponge wheels is coated with the siloxane tackifying resin solution.

16. The method of claim 13, wherein the crosslinked siloxane layer comprises a crosslinked polydimethylsiloxane polymer.

17. The method of claim 13, wherein the substrate layer comprises a metal or polymeric tube, and the crosslinked siloxane layer comprises a molded part.

18. The method of claim 13, wherein the siloxane tackifying resin composition comprises a siloxane tackifying resin powder, a siloxane tackifying resin solution, or a dispersion of siloxane tackifying resin in a solid media, where the solid media is not a siloxane-based media.

19. The method of claim 18, wherein the solid media comprises a wax.

20. The method of claim 13, wherein the substrate layer comprises a metal layer, a polymeric layer, a ceramic layer, or a glass layer.

21. The method of claim 20, wherein the substrate layer comprises a polymeric layer comprising a polyolefin, a polyacrylate, a polyester, a polyurethane, or a combination thereof.

* * * * *